(12) United States Patent
Enz et al.

(10) Patent No.: US 10,901,636 B2
(45) Date of Patent: Jan. 26, 2021

(54) TARGET OPTIMIZED AUTO PROVISIONING OF STORAGE IN A DISCOVERABLE STORAGE NETWORK

(71) Applicant: OVH US LLC, Newark, DE (US)

(72) Inventors: Michael Enz, Fargo, ND (US); Ashwin Kamath, Cedar Park, TX (US); Jayaram Bhat, Cedar Park, TX (US); Chidambara Rameshkumar, Fremont, CA (US)

(73) Assignee: OVH US LLC, Newark, DE (US)

( * ) Notice: Subject to any disclaimer, the term of this patent is extended or adjusted under 35 U.S.C. 154(b) by 0 days.

(21) Appl. No.: 16/565,889

(22) Filed: Sep. 10, 2019

(65) Prior Publication Data
US 2020/0081640 A1 Mar. 12, 2020

Related U.S. Application Data

(60) Provisional application No. 62/729,249, filed on Sep. 10, 2018.

(51) Int. Cl.
| | |
|---|---|
| *G06F 12/02* | (2006.01) |
| *G06F 3/06* | (2006.01) |
| *G06F 13/16* | (2006.01) |
| *G06F 13/40* | (2006.01) |
| *G06F 13/42* | (2006.01) |

(52) U.S. Cl.
CPC .......... *G06F 3/0632* (2013.01); *G06F 3/0604* (2013.01); *G06F 3/067* (2013.01); *G06F 3/0664* (2013.01); *G06F 13/1668* (2013.01); *G06F 13/4027* (2013.01); *G06F 13/4221* (2013.01); *G06F 12/023* (2013.01); *G06F 2213/0036* (2013.01)

(58) Field of Classification Search
None
See application file for complete search history.

(56) References Cited

U.S. PATENT DOCUMENTS

| | | | | |
|---|---|---|---|---|
| 8,190,769 | B1 * | 5/2012 | Shukla | H04L 49/70 709/238 |
| 8,898,418 | B2 * | 11/2014 | Strutt | G06F 3/067 711/170 |
| 10,176,116 | B2 * | 1/2019 | Sternberg | G06F 12/109 |

(Continued)

*Primary Examiner* — Brian R Peugh
(74) *Attorney, Agent, or Firm* — BCF LLP

(57) ABSTRACT

A storage target comprising a computer memory configured with storage provisioning parameters and a map of initiator information to the storage provisioning parameters. The storage target is configured to receive a discovery request from a requesting initiator, extract identifying information from the discovery request, determine a set of storage provisioning parameters to which the requesting initiator maps based on the extracted identifying information and the map of initiator information to storage provisioning parameters, dynamically create a new virtual target for the requesting initiator according to the set of storage provisioning parameters, dynamically create a storage partition from storage space of a plurality of storage devices according to the set of storage provisioning parameters, assign the storage partition to the new virtual target and return information about the new virtual target to the requesting initiator to allow the requesting initiator to connect to the new virtual target.

22 Claims, 4 Drawing Sheets

(56) References Cited

U.S. PATENT DOCUMENTS

| | | | |
|---|---|---|---|
| 10,628,353 B2* | 4/2020 | Prabhakar | G06F 3/067 |
| 2018/0089294 A1* | 3/2018 | Dray | G06F 16/25 |
| 2019/0243777 A1* | 8/2019 | Sternberg | G06F 12/109 |

* cited by examiner

TARGET OPTIMIZED AUTO PROVISIONING OF STORAGE IN A DISCOVERABLE STORAGE NETWORK

RELATED APPLICATIONS

This application claims the benefit of priority under 35 U.S.C. § 119(e) to U.S. Provisional Patent Application No. 62/729,249, entitled "Target Optimized Auto Provisioning of Storage in a Discoverable Storage Network," filed Sep. 10, 2018, which is hereby fully incorporated by reference herein for all purposes.

TECHNICAL FIELD

This disclosure relates generally to the field of data storage, and more particularly to systems and methods for automatically provisioning storage.

BACKGROUND

Businesses, governmental organizations and other entities often use storage networks to store the large amounts of data necessary in their daily operations. Storage networks use storage protocols that do not require file abstraction, but instead allow block-level operations or remote direct memory access operations over the network. Storage systems on a storage network are often accessible by multiple initiators. To provide data segregation between the initiators on a storage network, a storage system may provide the capability to provision different partitions of the storage system's storage space to different initiators.

Mechanisms that allow provisioning of storage to particular initiators on a storage network typically assume that the initiators connected to the storage network are relatively static. As the use of cloud-computing and other distributed computing platforms becomes more popular, however, the initiators that store data to storage networks are increasingly virtual devices that are created and destroyed as needed. Prior mechanisms of allocating storage to hosts do not adequately address this new paradigm. Therefore, there is a need for improved storage provisioning systems and methods to dynamically provision storage.

SUMMARY

Embodiments described herein provide systems and methods for automatically provisioning storage to initiators.

One embodiment includes a storage target comprising a first interface to connect to a network, a second interface to connect to a plurality of storage devices, a computer memory configured with storage provisioning parameters and a map of initiator information to the storage provisioning parameters and a processor coupled to the first interface, the second interface and the computer memory. The processor can be configured to: receive a discovery request from a requesting initiator on the network, the discovery request including identifying information for the requesting initiator; extract the identifying information from the discovery request; determine a set of storage provisioning parameters to which the requesting initiator maps based on the extracted identifying information and the map of initiator information to storage provisioning parameters; dynamically create a new virtual target for the requesting initiator according to the set of storage provisioning parameters; dynamically create a storage partition from storage space on the plurality of storage devices according to the set of storage provisioning parameters and assign the storage partition to the new virtual target; and return information about the new virtual target to the requesting initiator to allow the requesting initiator to connect to the new virtual target.

Another embodiment includes a method for dynamic storage provisioning comprising: connecting a storage target to a network, the storage target configured with storage provisioning parameters and a map of initiator information to storage provisioning parameters; receiving, by the storage target, a discovery request from a requesting initiator on the network, the discovery request including identifying information for the requesting initiator; extracting the identifying information from the discovery request; determining a set of storage provisioning parameters to which the requesting initiator maps based on the extracted identifying information and the map of initiator information to storage provisioning parameters; dynamically creating a new virtual target for the requesting initiator according to the set of storage provisioning parameters; dynamically creating a storage partition from storage space on a plurality of storage devices according to the set of storage provisioning parameters; assigning the storage partition to the new virtual target; and returning, by the storage target, information about the new virtual target to the requesting initiator to allow the requesting initiator to connect to the new virtual target.

Another embodiment includes a computer program product comprising a non-transitory computer readable medium storing computer-readable code executable by a processor to: access a computer memory configured with storage provisioning parameters and a map of initiator information to the storage provisioning parameters; receive a discovery request from a requesting initiator on a network, the discovery request including identifying information for the requesting initiator; extract the initiator identifying information from the discovery request; determine a set of storage provisioning parameters to which the requesting initiator maps based on the extracted identifying information and the map of initiator information to storage provisioning parameters; dynamically create a new virtual target for the requesting initiator according to the set of storage provisioning parameters; dynamically create a storage partition from storage space on a plurality of storage devices according to the set of storage provisioning parameters and assign the storage partition to the new virtual target; and return information about the new virtual target to the requesting initiator to allow the requesting initiator to connect to the new virtual target.

According to one embodiment, a storage target includes a provisioning state machine, referred to herein as a just in time provisioning (JITP) state machine, that creates virtual targets for initiators, allocates storage to the virtual targets and configures access controls for the virtual targets. According to one embodiment, a virtual target may be configured as a storage endpoint. For example, embodiments described herein may be implemented by a high availability module to dynamically provision endpoints. According to one embodiment, the JITP state machine implements rules to automatically create virtual targets for initiators and assign storage to virtual targets. The rules may be flexible so that the JITP can create virtual targets for previously unknown initiators.

Embodiments described herein provide a technical advantage by allowing a storage target to dynamically provision storage for initiators. Thus, embodiments of a storage target can provision storage for virtual devices added to a network.

Embodiments described herein provide a further advantage by allowing a storage target to dynamically provision storage for an initiator even if the initiator was unknown to the storage target prior to the storage target receiving a discovery request from the initiator.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

Figure 1:
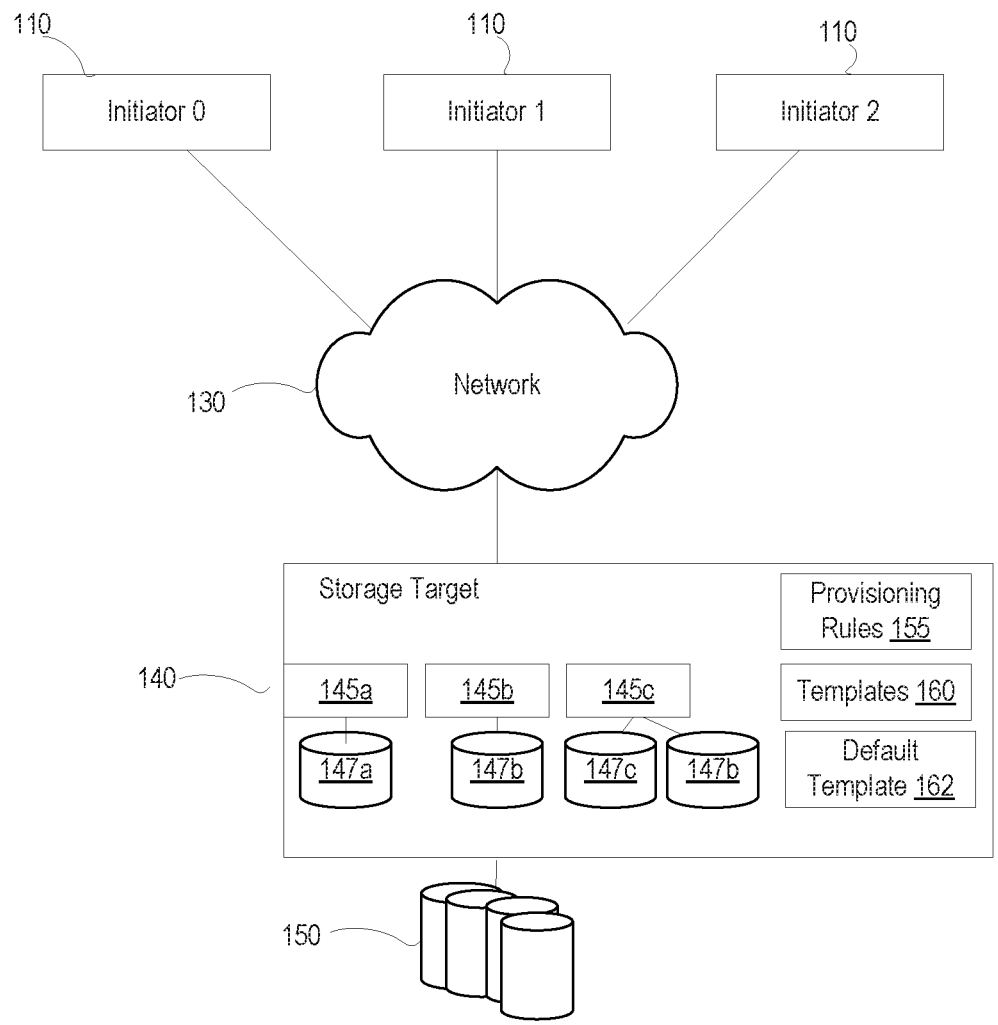
FIG. 1 is a diagrammatic representation of a storage area network in one embodiment.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

As discussed above, storage systems on a storage network are often accessible by multiple initiators. To provide data segregation between the initiators on a storage network, a storage system may provide the capability to provision different partitions of the storage system's storage space to different initiators. Existing methods that allow provisioning of storage to a particular initiator, however, typically assume that the initiators connected to the storage network are relatively static.

In a typical scenario, a storage system provides a management interface that allows an administrator to define virtual storage devices, map physical storage to the virtual storage devices and selectively assign the virtual storage devices to particular initiators. If the storage system supports "thin provisioning," the administrator defines the virtual storage devices and assigns the virtual storage devices to the initiators, but the storage system allocates physical storage locations to the virtual storage devices as needed to store data.

An iSCSI server, for example, may provide a management interface that allows an administrator to define, during a configuration stage, an iSCSI target, assign partitions to the iSCSI target, and specify which iSCSI initiators can access the iSCSI target and which iSCSI initiators can access each partition. During a discovery process by an iSCSI initiator, the iSCSI server returns the identity of the iSCSI target that the iSCSI initiator can access. The iSCSI initiator then requests that the iSCSI target return the logical unit numbers (LUNs) (storage partitions) of the iSCSI target that the iSCSI initiator can connect to and use. The iSCSI target returns LUNs for the partitions assigned to the iSCSI target and allocated to the iSCSI initiator in the configuration stage.

As the use of cloud-computing and other distributed computing platforms becomes more popular, the initiators that store data to storage networks are increasingly virtual devices that are created and destroyed as needed. Prior mechanisms of allocating storage to hosts do not adequately address this new paradigm.

Embodiments described herein provide systems and methods for automatically provisioning storage to initiators. According to one embodiment, a storage target includes a provisioning state machine, referred to herein as a just in time provisioning (JITP) state machine, that creates virtual targets for initiators, allocates storage to the virtual targets and configures access controls for the virtual targets. According to one embodiment, a virtual target may be configured as a storage endpoint. For example, embodiments described herein may be implemented by a high availability module to dynamically provision endpoints. The JITP state machine implements rules to automatically create virtual targets for initiators and assign storage to virtual targets. The rules may be flexible so that the JITP can create virtual targets for previously unknown initiators.

Some embodiments may be implemented in connection with a storage target in a network attached storage server. An example storage area network is illustrated in FIG. 1. As depicted in this figure, initiators 110 are coupled to a network 130 and can access data stored at storage target 140 that is coupled to network 130. The network 130 may use any suitable protocol, such as TCP, iSCSI, Infiniband, ROCE, Fibre Channel.

Storage target 140 may be any suitable storage target. For example, storage target 140 can be an iSCSI server—that is, a system that contains an iSCSI target or a network entity that supports iSCSI discovery sessions. As another example, storage target 140 may be a Non-Volatile Memory Express (NVMe) system—for example an NVMe over Fabric (NVMeoF) system—that contains an NVMe subsystem or NVMeoF discovery service.

Storage target 140 controls access to storage space on storage devices 150. Storage devices 150 provide non-volatile storage and can be any suitable storage device, such as magnetic hard disk drives, flash memory in the form of a solid-state drive (SSD) or other drives or persistent memory. The storage devices may support any suitable protocol, such as PCIe, SATA, SAS, SCSI, Fibre Channel or other protocol.

Embodiments of the invention automatically provision storage space on storage devices 150 to initiators. In particular, storage target 140 automatically creates virtual targets (e.g., virtual targets 145a, 145b, 145c) for initiators 110. The type of virtual targets created depends on the protocol being used. For example, the virtual targets may be iSCSI targets, NVMe subsystems or other virtual targets. A virtual target may be accessible by a single initiator or multiple initiators, depending on configuration.

Further, storage target 140 assigns partitions of the storage space on storage devices 150 to the virtual targets. For example, the storage target 140 may assign volumes to SCSI targets, which the SCSI targets make available as LUNs, or the storage target 140 may assign namespaces to virtual NVMe subsystems. In the embodiment illustrated, the storage target 140 assigns partition 147a to virtual target 145a, partition 147b to virtual target 145b and partitions 147c and 147d to virtual target 145c.

Partitions 147a, 147b, 147c, and 147d are each a logical storage definition that represents a portion of the storage space of storage devices 150. For example, each partition may map to a range of logical block addresses (LBAs) at a storage device 150 or LBAs that span storage devices 150. A partition can be, for example, a RAID set that spans multiple storage devices 150. In one embodiment, partitions 147a, 147b, 147c, and 147d may each map to distinct portions of the storage space of storage devices 150. The mapping between a partition and specific storage on storage devices 150 can be defined when a partition is created or through thin provisioning.

As discussed above, access to a virtual target may be limited to a particular initiator or set of initiators. For example, access controls can be configured such that virtual target 145a is only accessible by only Initiator 0, virtual target 145b is only accessible by Initiator 1 and virtual target 145c is only accessible by Initiator 2. In this example then only Initiator 0 can access partition 147a, only Initiator 1 can access partition 147b and only Initiator 2 can access partitions 147c and 147d.

Storage target 140 can be configured with a number of storage templates 160. The storage templates 160 can include templates stored on storage target 140 when storage target 140 is manufactured, user-configured storage templates (e.g., storage templates configured or uploaded using an application program interface (API), command line interface (CLI) or other interface provided by storage target 140), storage templates downloaded by storage target 140 during an update or other storage templates.

A storage template 160 comprises a set of provisioning parameters for provisioning a virtual target. In some embodiments, the provisioning parameters of a storage template 160 correspond to a class of service. For example, the provisioning parameters of a storage template 160 may correspond to industry standard classes of service, such as the classes of service defined by the Storage Networking Industry Association's (SNIA) Redfish and Swordfish specifications. In other embodiments, the classes of service may be proprietary classes of service.

Examples of provisioning parameters include, but are not limited to: size of a dynamically created partition; data redundancy encoding, such as RAID level; bandwidth constraints on data access to the partitions; NIC port numbers, network addresses, VLANs, subnets to associate with the virtual targets; the local processor to which a virtual target should be assigned. Storage target 140 uses the provisioning parameters to create and provision virtual targets.

By way of example, but not limitation, storage target 140 may be configured with a "database" storage template 160 for a "database" class of service that requires: a 1 TB volume; the ability to handle two drive failures; 100 microsecond latency response; a maximum bandwidth of 1 GB/s; the volume must be accessible from NIC Port 0. A "database" virtual target can be provisioned according to the "database" storage template 160 using enough drives to achieve 1 GB/s with two additional drives for dual parity information. For example, if each storage device 150 can achieve 250 MB/s, four drives are required for bandwidth and two additional drives for redundancy. Therefore, storage target 150 may create a RAID6 encoded volume using a 4+2 (4 data plus 2 parity) drive configuration, using a portion of these drives to provide a 1 TB volume. The drive selection may be further refined based on efficiency concerns in the storage target that may depend on the network port that is required to access the data. For example, storage target 140 may give preference to allocating storage devices 150 that have more efficient data transfer to the selected network port (NIC Port 0 in this example).

As another example, storage target 140 may be configured with a storage template 160 for a "scratch" space for temporary files. In one example, the provisioning parameters of the "scratch" space storage template 160 may specify: a capacity, no redundancy data, 5 GB/s of bandwidth, and a 300 microsecond latency requirement. A "scratch" virtual target can be provisioned according to the "scratch" storage template 160 using enough drives to achieve 5 GB/s. For example, if each storage device 150 can achieve 250 MB/s, twenty drives are required to achieve 5 GB/s. As such, storage target 140 can provision storage for a "scratch" space virtual target by striping data across 20 drives with RAID0 to provide high bandwidth.

The latencies associated with virtual targets—for example, the latencies specified in the storage templates from which the virtual targets were created—can be used for configuring data paths and queueing. For example, the data path may be configured to queue requests to a "scratch" virtual target at a lower priority than requests to a "database" virtual target so that "database" traffic is served first with lower latency.

If a storage template 160 does not provide a value for a particular provisioning parameter, storage target 140 may perform provisioning according to a default for that parameter. For example, if a storage template 160 does not specify a port for a virtual target, storage target 140 can make a virtual target created from that template available on a default port or ports (e.g., all ports), depending on implementation.

In some embodiments, storage target 140 may be configured with a default storage template 162 (that is a default set of provisioning parameters). If an initiator does not map to another storage template 160, storage target 140 can use the default storage template 162 to create a virtual target.

Storage target 140 implements a set of provisioning rules 155 to automatically provision virtual targets to initiators. According to one embodiment, the provisioning rules 155 map information about initiators (initiator names, initiator addresses or other information) to provisioning parameters. More particularly, the provisioning rules 155 can map information about initiators to storage templates 160 that are used to provision virtual targets.

As will be appreciated, initiators in storage networks typically have a name that is architected to be unique within an operational domain (in some cases, worldwide). For example, each iSCSI device (iSCSI initiator or iSCSI target) has an iSCSI name (internet qualified names (iqn)) that can be used to uniquely identify that iSCSI device and each NVMeoF host and NVM subsystem has an NVMe qualified name (nqn) (a host nqn, can be referred to as a host qualified name (hqn)) that is used to uniquely describe the host or NVM subsystem for the purposes of identification and authentication. Storage target 140 can use an initiator's name, or other information, to select a storage template 160 for dynamically provisioning storage to the initiator.

In a particular embodiment, the provisioning rules 155 contain an expression dictionary that is applied to an initiator name. Based on identifying particular patterns (e.g., words, phrases, text strings) in the initiator name, the storage target 140 determines the set of provisioning parameters (e.g., storage template 160) to use to create a virtual target and provision storage to the virtual target.

According to one embodiment, when storage target 140 receives a discovery request from an initiator (e.g., iSCSI initiator, NVMeoF host or other initiator) requesting available targets, the storage target 140 extracts identifying information from the discovery request to more effectively provision partitions via the virtual targets. The storage target 140 determines from provisioning state information if an active virtual target has already been assigned to the initiator. If so, the storage target 140 returns the virtual target information to the initiator (e.g., the information to allow the initiator to connect to the iSCSI target, the NVM subsystem or another virtual target). If not, storage target 140 applies the provisioning rules 155 to the extracted information to map the discovery request to a set of provisioning parameters.

If the extracted information maps to a storage template 160, storage target 140 uses the set of provisioning parameters from the storage template 160 to create and configure a virtual target for the initiator and provision storage to the virtual target. Storage target 140 can further set access rights on the virtual target so that the requesting initiator can access the dynamically created virtual target. In some embodiments, storage target 140 set access rights on the virtual target so that only the requesting initiator can access the dynamically created virtual target from the network. Storage target 140 returns the information for the dynamically created virtual target to the requesting initiator (e.g., returns the information to allow the initiator to connect to a dynamically created iSCSI target, dynamically created NVM subsystem or other dynamically created virtual target).

In some embodiments, the host name string that is transmitted from an initiator to storage target 140 during the discovery encodes overrides for one or more of the provisioning parameters of a storage template 160. For example, a host name may include a substring such as "capacity:250 GB" to override a capacity parameter in the template 160 to which the initiator name maps.

If the extracted information does not map to a storage template 160, the storage target 140 returns virtual target information for a default virtual target. In some embodiments, storage target 140 dynamically creates a default virtual target for the requesting initiator. In other embodiments, storage target 140 returns virtual target information for an existing default virtual target.

Storage target 140 tracks the state of the virtual targets and may implement administrative functions, such as garbage collection, to delete partitions and destroy virtual targets when certain conditions are met. For example, storage target 140 may remove a virtual target when an initiator disconnects from the virtual target or if the virtual target has not been accessed for a threshold amount of time.

Figure 2:
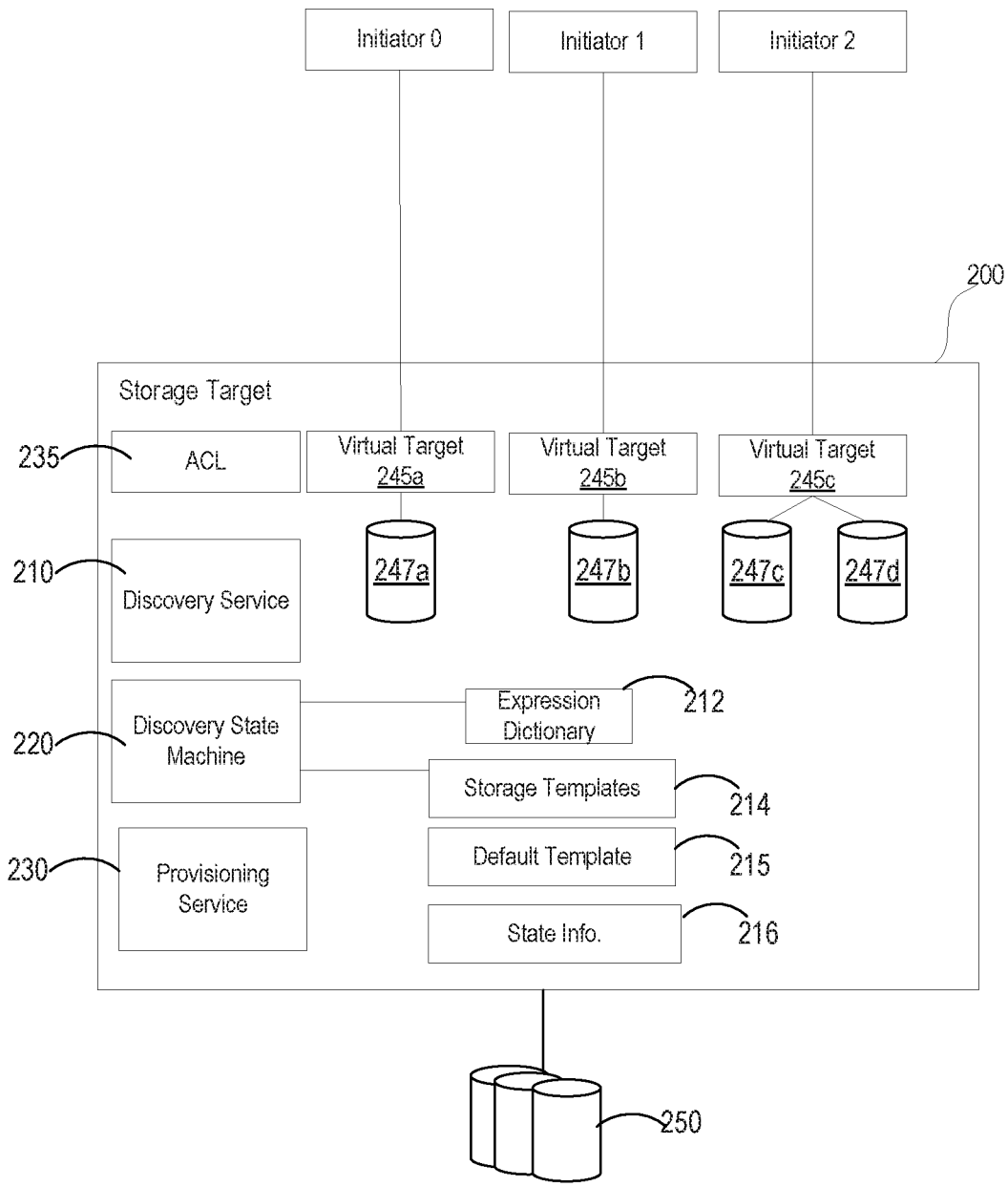
FIG. 2 is a diagrammatic representation of one embodiment of a storage target.

Referring to FIG. 2, a functional block diagram illustrating one embodiment a storage target 200 is illustrated. Storage target 200 may be an embodiment of a storage target 140.

Storage target 200 controls access to storage space on storage devices 250. Storage devices 250 provide non-volatile storage and can be any suitable storage device, such as magnetic hard disk drives, flash memory in the form of an SSD or other drives. The storage devices may support any suitable protocol, such as PCIe, SATA, SAS, SCSI, Fibre Channel or other protocol.

Storage target 200 can be implemented for various types of targets. According to one embodiment, storage target 200 is an iSCSI server—that is, a system that contains an iSCSI target or a network entity that supports iSCSI discovery sessions. As another example, storage target 200 may be an NVMe system, for example an NVMeoF system, that contains an NVMe subsystem or NVMeoF discovery service.

Storage target 200 automatically provisions storage space on storage devices 250 to initiators. In particular, storage target 200 automatically creates virtual targets (e.g., virtual targets 245a, 245b, 245c) for initiators. The type of virtual targets created depends on the protocol being used. For example, the virtual targets may be iSCSI targets, NVMe subsystems or other virtual targets. A virtual target may be accessible by a single initiator or multiple initiators, depending on configuration.

Further, storage target 200 assigns partitions of the storage space on storage devices 250 to the virtual targets. For example, the storage target 200 may assign volumes to SCSI targets (e.g., iSCSI targets), which the SCSI targets make available as LUNs, or the storage target 200 may assign namespaces to virtual NVMe subsystems. In the embodiment illustrated, storage target 200 assigns partition 247a to virtual target 245a, partition 247b to virtual target 245b and partitions 247c and 247d to virtual target 245c.

Partitions 247a, 247b, 247c, and 247d are each a logical storage definition that represents a portion of the storage space of storage devices 250. For example, each partition may map to a range of logical block addresses (LBAs) at a storage device 250 or LBAs that span storage devices 250. A partition can be, for example, a RAID set that spans multiple storage devices 250. In one embodiment, partitions 247a, 247b, 247c, and 247d may each map to distinct portions of the storage space of storage devices 250. The mapping between a partition and specific storage on storage devices 250 can be defined when a partition is created or through thin provisioning.

As discussed above, access to a virtual target may be limited to a particular initiator or set of initiators. For example, access controls can be configured so that virtual target 245a is only accessible by Initiator 0, virtual target 245b is only accessible by Initiator 1 and virtual target 245c is only accessible by Initiator 2. In this example then only Initiator 0 can access partition 247a, only Initiator 1 can access partition 247b and only Initiator 2 can access partitions 247c and 247d.

According to one embodiment, storage target 200 comprises a JITP state machine that includes a discovery service 210, discovery state machine 220 and provisioning service 230. Discovery service 210, discovery state machine 220 and provisioning service 230 may comprise program code to perform discovery operations, create virtual targets, provision storage to virtual targets and track the state of virtual targets.

Discovery service 210 is a service that initiators can query for available targets using discovery requests. For example, discovery service 210 may be a service of an iSCSI service that initiators can query for available iSCSI targets. As another example, discovery service 210 can be a service that provides an NVMeoF discovery controller. Discovery service 210 further maintains state information for initiators and virtual targets (e.g., state information 216), dynamically creates virtual targets and sets up the Access Control Lists (ACLs) for the virtual targets.

Discovery state machine 220 probes incoming discovery requests to extract initiator identifying information from the discovery request. For example, the discovery state machine 220 may extract an address (e.g., ip address or other address), the iqn, hqn or other information from a discovery request. Discovery state machine 220 determines from state information 216 if an active virtual target has been created for the initiator (for the address, initiator name or other extracted identifying information) and, if so, interacts with discovery service 210 to return the identity of the virtual target to the requesting initiator (e.g., the information to allow the initiator to connect to the iSCSI target, the NVM subsystem or other virtual target assigned to that initiator).

If an active virtual target does not exist for the requesting initiator, discovery state machine 220 places the initiator in a provisioning state (e.g., updates state information 216 for the initiator) and interacts with discovery service 210 to create and configure the virtual target and provisioning service 230 to provision storage to the virtual target. An expression dictionary 212 maps identifying information or portions thereof to storage templates 214, where each storage template comprises a set of provisioning parameters. For example, the expression dictionary 212 may map the strings "database" to a particular template 214. In such an example, discovery state machine 220 will map an iqn or hqn that contains "database1" and an iqn or hqn that contains "database2" to the same storage template 214. In another embodiment, the expression dictionary 212 may map the string "database1" to a first storage template 214 and "database2" to a second storage template 214. In such an example, discovery state machine 220 will map an iqn or hqn that contains "database1" in the iqn or hqn to the first storage template 214 and an iqn or hqn that contains "database2" to a second storage template 214.

Discovery state machine 220 uses the storage template 214 to determine the properties needed for the dynamically created resources. A storage template 214 specifies parameters for creating a virtual target and virtual partition to assign to the partition. Non-limiting examples of storage templates and provisioning parameters are discussed above in conjunction with FIG. 1. If a storage template 214 does not provide a value for a particular provisioning parameter, storage target 200 may perform provisioning according to a default for that parameter.

In some embodiments, the host name string that is transmitted from an initiator to storage target 200 during the discovery encodes overrides for one or more of the provisioning parameters of a template 214. For example, a host name may include a substring such as "capacity:250 GB" to override a capacity parameter in the template 214 to which the initiator name maps.

Based on the parameters determined for a discovery request, discovery state machine 220 interacts with discovery service 210 to create a virtual target configured according to the provisioning parameters. For example, discovery service 210 may create a new iSCSI target at a particular IP address and associated with one or more ports at the iSCSI server. As another example, discovery service 210 can create a virtual NVMe subsystem having an NVMe controller for each port specified in the provisioning parameters according to which the NVMe subsystem is being created.

Discovery service 210 assigns the new virtual target a unique name and associates the virtual target with the requesting initiator in state information 216. Further, discovery service 210 configures an ACL 235 for the virtual target so that the virtual target is accessible by the requesting initiator. In some embodiments, discovery service 210 configures ACL 235 so that the virtual target is only accessible by the requesting initiator for which it was created. The state machine 220 also interacts with the provisioning service 230 to dynamically create a storage partition(s) (LUN, namespace or other virtual storage) based on the provisioning parameters and associate the storage partition with the dynamically created virtual target.

Discovery service 210 returns the information necessary for the requesting initiator to connect to the virtual target. It can be noted that in some embodiments discovery service 210 can return the virtual target information to the requesting initiator before creating the virtual target at storage target 200 (e.g., before instantiating the iSCSI virtual target or virtual NVMe subsystem). Discovery service 210 also updates the state information 216 to associate the requesting initiator with the dynamically created virtual target.

In one embodiment, if the initiator name does not map to a storage template 214, a default set of provisioning parameters (e.g., a default storage template 215) can be used to create a new virtual target for the initiator and provision storage to the virtual target. In another embodiment, an existing default virtual target may be returned to the initiator.

Storage target 200 tracks the state of the virtual targets and may implement administrative functions, such as garbage collection, to delete partitions and destroy virtual targets when certain conditions are met. For example, storage target 200 may remove a virtual target when an initiator disconnects from the virtual target or if the virtual target has not been accessed for a threshold amount of time.

Figure 3:
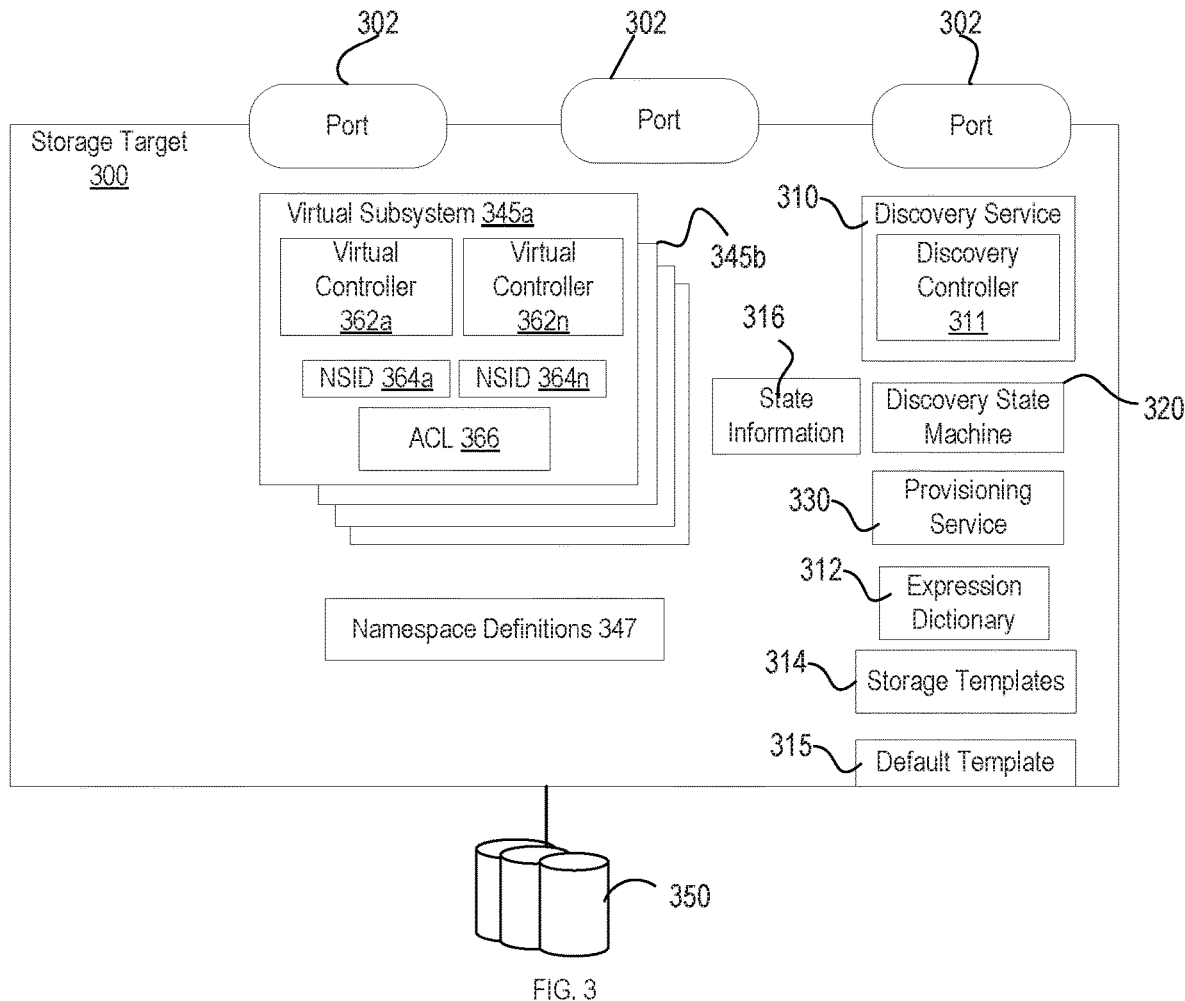
FIG. 3 is a diagrammatic representation of one embodiment of an NVMe storage target.

Referring to FIG. 3, a functional block diagram illustrating one embodiment a storage target 300 is illustrated. Storage target 300 may be an example of a storage target 140, 200.

Storage target 300 comprises an NVMeoF storage target that connects to a fabric by ports 302. Storage target 300 controls access to storage space on storage devices 350. Storage devices 350, according to one embodiment are SSD drives.

Embodiments of the invention automatically provision storage space on storage devices 350 to initiators. In particular, storage target 300 automatically creates virtual NVMe subsystems (e.g., virtual NVMe subsystem 345a, virtual NVMe subsystem 345b) as virtual targets for initiators. A virtual target may be accessible by a single initiator or multiple initiators, depending on configuration. Further, storage target 300 assigns partitions of the storage space on storage devices 350 to the virtual targets. In particular, storage target 300 dynamically creates namespace definitions 347 and assigns namespaces to the virtual NVMe subsystems.

According to one embodiment, storage system 300 comprises a JITP state machine that includes a discovery service 310, discovery state machine 320 and provisioning service 330. Discovery service 310, discovery state machine 320 and provisioning service 330 may comprise program code to perform discovery operations, create virtual targets, provision storage to virtual targets and track the state of virtual targets.

Discovery service 310 is a service that initiators can query for available targets. In particular, discovery service 310 provides an NVMe discovery controller 311. Discovery service 310 further maintains the state of initiators and virtual targets (e.g., state information 316) and dynamically creates and sets up the ACLs for the virtual targets.

Discovery state machine 320 probes incoming discovery requests to extract initiator identifying information from the discovery request. For example, the discovery state machine 320 may extract an address, hqn or other information from a discovery request. Discovery state machine 320 determines from state information 316 if an active virtual target has been created for the initiator (for the address, initiator name or other extracted identifying information) and, if so, interacts with discovery service 310 to return the identity of the virtual target to the requesting initiator (e.g., the information to allow the initiator to connect to the virtual NVM subsystem assigned to that initiator).

If an active virtual target does not exist for the requesting initiator, discovery state machine 320 places the initiator in a provisioning state (e.g., updates state information 316 for the initiator) and interacts with discovery service 310 to create the virtual target and provisioning service 330 to provision storage to the virtual target. To this end, an expression dictionary 312 maps identifying information or portions thereof to a storage template (i.e., a set of provisioning parameters). For example, the expression dictionary 312 may map the string "database" to a particular template 314. In such an example, discovery state machine 320 will map an hqn that contains "database1" to the storage template and hqn that contains "database2" to the same storage template 314. In another embodiment, expression dictionary 312 may map the string "database1" to a first storage template 314 and "database2" to a second storage template 314. In such an example, discovery state machine 320 will map an hqn that contains "database1" to the first storage template 314 and hqn that contains "database2" to the second storage template 314.

Discovery state machine 320 uses the storage templates 314 to determine the properties needed for the dynamically created resources. A storage template 314 specifies provisioning parameters for creating a virtual target and virtual partition to assign to the partition. Non-limiting examples of storage templates and provisioning parameters are discussed above in conjunction with FIG. 1. If a storage template 314 does not provide a value for a particular provisioning parameter, storage target 300 may perform provisioning according to a default for that parameter.

In some embodiments, the host name string that is transmitted from an initiator to storage target 300 during the discovery encodes overrides for one or more of the provisioning parameters of a template 314. For example, a host name may include a substring such as "capacity:250 GB" to override a capacity parameter in the template 314 to which the initiator name maps.

Based on the provisioning parameters determined for a discovery request, discovery state machine 320 interacts with discovery service 310 to create a virtual target configured according to the provisioning parameters. For example, discovery service 310 may create a new virtual NVMe subsystem (e.g., virtual NVMe subsystem 345a) having a virtual NVMe controller for each port specified in the provisioning parameters according to which the NVMe subsystem is being created. Discovery service 310 assigns the new virtual target a unique name and associates the virtual target with the requesting initiator in state information 316. According to one embodiment, for example, the discovery service assigns a globally unique identifier (GUID) to each new virtual target so that virtual target names cannot conflict. This also provides security because it would be difficult to use the wrong name, thereby providing additional security. Further, discovery service 310 configures an ACL for the virtual target so that the virtual target is accessible by the requesting initiator. In some embodiments, discovery service 310 configures the ACL so that the virtual target is only accessible by the requesting initiator for which it was created. Discovery service 310 returns the information necessary for the requesting initiator to connect to the virtual target. It can be noted that in some embodiments discovery service 310 can return the virtual target information to the requesting initiator before creating the virtual target at storage target 300 (e.g., before instantiating the virtual NVMe subsystem). The state machine 320 also interacts with the provisioning service 330 to dynamically create a new NVMe namespace definition based on the provisioning parameters and assign the new namespace to the new virtual NVMe subsystem.

FIG. 3 illustrates one embodiment of a virtual NVMe subsystem 345a dynamically created for an initiator. As would be appreciated by those in the art, there is a 1:1 relationship between NVMe controllers and ports. Thus, virtual NVMe subsystem 345a includes a virtual controller 362a . . . 362n for each port 302 over which the NVMe subsystem 345a is accessible. Each virtual controller 362a . . . 362n includes one or more assigned virtual namespace identifiers 364a . . . 364n. It will be appreciated that the number of namespace identifiers may be different than the number of virtual controllers.

According to one embodiment, each virtual namespace identifier 364a . . . 364n identifies a namespace definition in namespace definitions 347, which defines a partition (range of addresses) in the storage space of storage devices 350. The virtual NVMe subsystem 345a may include access control information (e.g., ACL 366) which indicates subsets of initiators allowed to access virtual controllers 362a . . . 362n and namespaces (virtual or physical) specified by namespace identifiers 364a . . . 364n.

In one embodiment, if the initiator name does not map to a storage template, a default set of provisioning parameters (e.g., a default storage template 315) can be used to create a new virtual target for the initiator and provision storage to the virtual target. In another embodiment, an existing default virtual target may be returned to the initiator.

Storage target 300 tracks the state of the virtual targets and may implement administrative functions, such as garbage collection, to delete partitions and destroy virtual targets when certain conditions are met. For example, storage target 300 may remove a virtual target when an initiator disconnects from the virtual target or if the virtual target has not been accessed for a threshold amount of time.

Figure 4:
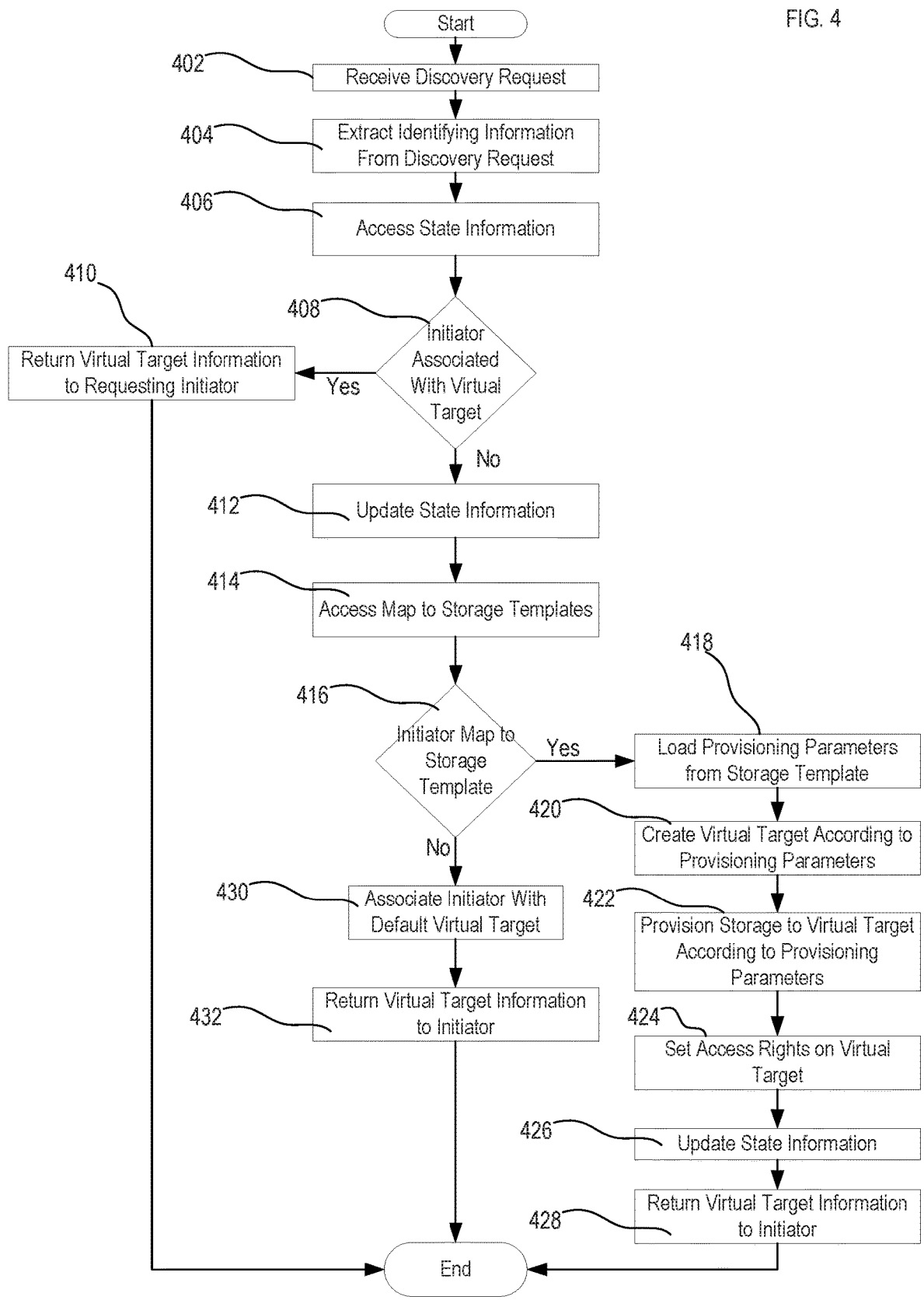
FIG. 4 is a flow chart illustrating one embodiment of provisioning storage.

FIG. 4 is a flow chart of one embodiment of a method for dynamic storage provisioning. The method may be embodied as computer-readable instructions stored on a non-transitory computer readable medium performed by a processor executing the instructions.

An initiator on a storage network can query storage systems on the network for storage available to the initiator. Thus, a storage target can receive a discovery request from an initiator (step 402). The storage target extracts identifying information, such as an address, qualified name and/or other identifying information, from the discovery request (step 404). The storage target accesses a set of state information (step 406) and determines from the state information if an active virtual target has already been assigned to the initiator (step 408). If so, the storage target returns virtual target information to the initiator (e.g., the information to allow the initiator to connect to the iSCSI target, the NVM subsystem or other virtual target) (step 410). If not, the storage target updates the state information for the initiator to indicate the initiator is in a provisioning state (step 412) and provisions a virtual target for the initiator.

With respect to provisioning a virtual target, the storage target accesses a set of provisioning rules and provisions the virtual target according to the provisioning rules. According to one embodiment, the storage target accesses a mapping to storage templates (step 414) and determines if the requesting initiator maps to a storage template (e.g., in a set of storage templates) (step 416). According to one embodiment, the storage target accesses an expression dictionary that maps identifying information or portions thereof to one or more storage templates and determines if the identifying information extracted from the discovery request maps to a storage template.

If the identifying information from the discovery request maps to a storage template according to the mapping, the storage target reads the provisioning parameters from the storage template (step 418) and uses the provisioning parameters to create a virtual target for the initiator (step 420). As will be appreciated the type of virtual target created depends on the protocol being used. For example, the virtual targets may be iSCSI targets, NVMe subsystems or other virtual targets. A virtual target may be accessible by a single initiator or multiple initiators, depending on configuration. In creating a virtual target, the storage target can assign the virtual target a unique name.

The storage target further provisions storage space to the virtual target (step 422). The storage may create partitions of storage on storage devices and assigns the partitions the virtual target (e.g., assigns a partition as a LUN on an iSCSI target, assigns a namespace to an NVMe target). The mapping between a partition and specific storage on the one or more storage devices can be defined when a partition is created or through thin provisioning.

The storage target can create or update an access control list for the dynamically created virtual target (step 424). In some embodiments, the access controls for the dynamically created virtual target are configured such that only the requesting initiator for which the virtual target was created is the only initiator that can access the virtual target (e.g., read from or write to the virtual target). The storage target further updates the state information to associate the initiator with the dynamically created virtual target (step 426). The storage target returns the virtual target information to the initiator so that the initiator can connect to the virtual target (step 428).

Returning to step 416, if the identifying information from the discovery request does not map to a storage template, the storage target performs default virtual target processing. According to one embodiment, updates state information to associate the initiator with the default virtual target (step 430) and returns the default virtual target information to the initiator (step 432). In another embodiment, the storage target dynamically creates a new virtual target based on a default storage template. For example, the storage target can perform steps similar to steps 418-428 using the default storage template.

It will be appreciated that FIG. 4 is provided by way of example. The steps of FIG. 4 can be repeated, steps omitted, steps added, or alternative steps used.

Figure 5:
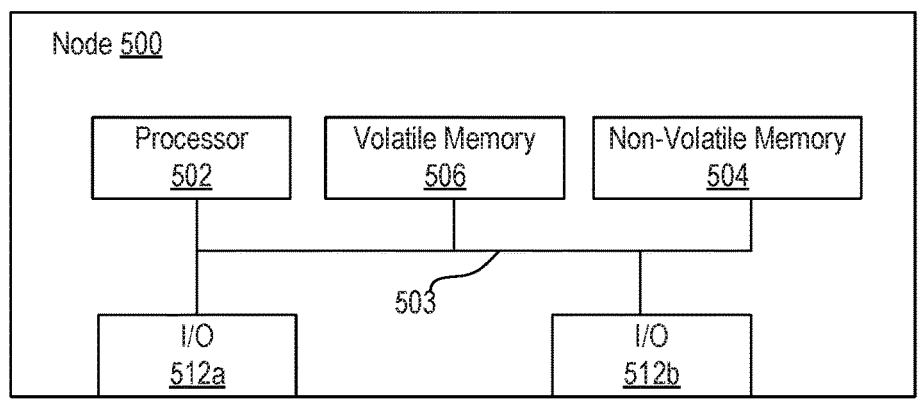
FIG. 5 is a diagrammatic representation of a node architecture.

FIG. 5 illustrates an embodiment of a computer node architecture 500, which may be one example of components included in a storage target 140, 200, 300, including a processor 502 that communicates over a bus 503 with a volatile memory device 506 in which programs, operands and parameters being executed are cached, and a non-volatile storage device 504, such as target system memory that holds code, rules, an expression dictionary, storage templates, provisioning parameters, definitions of virtual storage and virtual targets and other data. The bus 503 may comprise multiple buses.

Further, the bus 503 may comprise a multi-agent bus or not be a multi-agent bus. According to one embodiment, bus 503 may provide point-to-point connections according to PCIe architecture. The processor 502 may also communicate with Input/output (I/O) devices 512a, 512b, which may comprise input devices, display devices, graphics cards, ports, network interfaces, or other I/O devices. In certain embodiments, the computer node architecture 500 may comprise a personal computer, server, mobile device or embedded computer device. In a silicon-on-chip (SOC) implementation, the architecture 500 may be implemented in an integrated circuit die.

Architecture 500 may include or connect to underlying storage devices (e.g., storage devices 150, 250, 350) that provide storage space for virtual targets. The storage devices may support any suitable protocol, such as PCIe, SATA, SAS, SCSI, Fibre Channel or other protocol. In certain implementations, the architecture 500 may include a PCIe bus to connect to NVMe storage devices. In certain embodiments, architecture 500 may include a network adaptor to connect to a fabric or network and send communications according to various protocols to communicate with other storage systems to access the underlying storage devices. In certain embodiments, architecture 500 may include a network adaptor to connect to a fabric or network and send communications using an NVMe interface to communicate with other storage systems to access underlying storage devices.

In some embodiments, architecture 500 maintains the allocations of physical storage to partitions, implements RAID processing, and otherwise creates partitions. In some embodiments, the underlying physical storage devices may be part of another storage system (e.g., a third-party storage system) or be behind another storage controller, such as a RAID controller, that has its own management interface. In such an embodiment, the storage target may create a partition by interacting with the management interface to partition the underlying storage into virtual storage devices. Thus, in some embodiments, a partition assigned to the virtual target may be a logical storage device provided by another storage system or controller.

One embodiment can include one or more computers communicatively coupled to a network. As is known to those skilled in the art, the computer can include a central processing unit ("CPU"), at least one read-only memory ("ROM"), at least one random access memory ("RAM"), at least one hard drive ("HD"), and one or more I/O device(s). The I/O devices can include a keyboard, monitor, printer, electronic pointing device (such as a mouse, trackball, stylus, etc.), or the like. In various embodiments, the computer has access to at least one database.

ROM, RAM, and HD are computer memories for storing computer-executable instructions executable by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of compiled C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all of the claims.

What is claimed is:

1. A storage target comprising:
a first interface to connect to a network;
a second interface to connect to a plurality of storage devices;
a computer memory configured with storage provisioning parameters and a map of initiator information to the storage provisioning parameters; and
a processor coupled to the first interface, the second interface and the computer memory, the processor configured to:
receive a discovery request from a requesting initiator on the network, the discovery request including identifying information for the requesting initiator;
extract the identifying information from the discovery request;
determine a set of storage provisioning parameters to which the requesting initiator maps based on the extracted identifying information and the map of initiator information to storage provisioning parameters;
dynamically create a new virtual target for the requesting initiator according to the set of storage provisioning parameters;
dynamically create a storage partition from storage space on the plurality of storage devices according to the set of storage provisioning parameters and assign the storage partition to the new virtual target; and
return information about the new virtual target to the requesting initiator to allow the requesting initiator to connect to the new virtual target.

2. The storage target of claim 1, wherein the new virtual target is a virtual NVMe subsystem comprising a virtual controller.

3. The storage target of claim 2, wherein creating the storage partition comprises creating a new NVMe namespace and wherein assigning the storage partition to the new virtual target comprises configuring the virtual controller with a virtual namespace identifier for the new NVMe namespace.

4. The storage target of claim 1, wherein the new virtual target is an iSCSI target.

5. The storage target of claim 4, wherein assigning the storage partition to the iSCSI target comprises assigning the storage partition as a LUN at the iSCSI target.

6. The storage target of claim 1, wherein the map of initiator information to storage provisioning parameters comprises an expression dictionary that maps a plurality of expressions to a plurality of sets of provisioning parameters.

7. The storage target of claim 6, wherein determining the set of storage provisioning parameters to which the initiator maps comprises recognizing a first expression from the expression dictionary in the identifying information and determining that the first expression maps to the set of storage provisioning parameters.

8. The storage target of claim 1, wherein the processor is further configured to:
configure an access control list for the new virtual target to allow the requesting initiator to access the new virtual target and prevent other initiators on the network from accessing the new virtual target.

9. A method for dynamic storage provisioning comprising:
connecting a storage target to a network, the storage target configured with storage provisioning parameters and a map of initiator information to the storage provisioning parameters;
receiving, by the storage target, a discovery request from a requesting initiator on the network, the discovery request including identifying information for the requesting initiator;
extracting the identifying information from the discovery request;
determining a set of storage provisioning parameters to which the requesting initiator maps based on the extracted identifying information and the map of initiator information to storage provisioning parameters;

dynamically creating a new virtual target for the requesting initiator according to the set of storage provisioning parameters;

dynamically creating a storage partition from storage space on a plurality of storage devices according to the set of storage provisioning parameters;

assigning the storage partition to the new virtual target; and returning, by the storage target, information about the new virtual target to the requesting initiator to allow the requesting initiator to connect to the new virtual target.

10. The method of claim 9, wherein the new virtual target is a virtual NVMe subsystem comprising a virtual controller.

11. The method of claim 10, wherein creating the storage partition comprises creating a new NVMe namespace and wherein assigning the storage partition to the new virtual target comprises configuring the virtual controller with a virtual namespace identifier for the new NVMe namespace.

12. The method of claim 9, wherein the new virtual target is an iSCSI target.

13. The method of claim 12, wherein assigning the storage partition to the iSCSI target comprises assigning the storage partition as a LUN at the iSCSI target.

14. The method of claim 9, wherein the map of initiator information to storage provisioning parameters comprises an expression dictionary that maps a plurality of expressions to a plurality of sets of provisioning parameters.

15. The method of claim 14, wherein determining the set of storage provisioning parameters to which the initiator maps comprises recognizing a first expression from the expression dictionary in the identifying information and determining that the first expression maps to the set of storage provisioning parameters.

16. The method of claim 9, further comprising configuring an access control list for the new virtual target to allow the requesting initiator to access the new virtual target and prevent other initiators on the network from accessing the new virtual target.

17. A computer program product comprising a non-transitory computer readable medium storing computer-readable code executable by a processor to:

access a computer memory configured with storage provisioning parameters and a map of initiator information to the storage provisioning parameters;

receive a discovery request from a requesting initiator on a network, the discovery request including identifying information for the requesting initiator;

extract the identifying information from the discovery request;

determine a set of storage provisioning parameters to which the requesting initiator maps based on the extracted identifying information and the map of initiator information to storage provisioning parameters;

dynamically create a new virtual target for the requesting initiator according to the set of storage provisioning parameters;

dynamically create a storage partition from storage space on a plurality of storage devices according to the set of storage provisioning parameters and assign the storage partition to the new virtual target; and return information about the new virtual target to the requesting initiator to allow the requesting initiator to connect to the new virtual target.

18. The computer program product of claim 17, wherein the new virtual target is a virtual NVMe subsystem comprising a virtual controller and the storage partition comprises an NVMe namespace.

19. The computer program product of claim 17, wherein the new virtual target is an iSCSI target.

20. The computer program product of claim 17, wherein the map of initiator information to storage provisioning parameters comprises an expression dictionary that maps a plurality of expressions to a plurality of sets of provisioning parameters.

21. The computer program product of claim 20, wherein determining the set of storage provisioning parameters to which the initiator maps comprises recognizing a first expression from the expression dictionary in the identifying information and determining that the first expression maps to the set of storage provisioning parameters.

22. The computer program product of claim 17, wherein the computer-readable code is further executable to configure an access control list for the new virtual target to allow the requesting initiator to access the new virtual target and prevent other initiators on the network from accessing the new virtual target.

* * * * *